(12) United States Patent
Malysh et al.

(10) Patent No.: US 7,899,031 B2
(45) Date of Patent: Mar. 1, 2011

(54) LOCALLY TERMINATING AN ESTABLISHED CONNECTION

(75) Inventors: Alexander Malysh, Bothell, WA (US); Maxim V Stepin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 11/942,737

(22) Filed: Nov. 20, 2007

(65) Prior Publication Data

US 2009/0129399 A1    May 21, 2009

(51) Int. Cl.
*H04L 12/28* (2006.01)
(52) U.S. Cl. ................................ 370/351
(58) Field of Classification Search ......... 370/216–220, 370/351, 389, 400; 709/227, 228, 230, 231, 709/238, 239, 246
See application file for complete search history.

(56) References Cited

U.S. PATENT DOCUMENTS

| | | | |
|---|---|---|---|
| 5,867,661 A | 2/1999 | Bittinger et al. | |
| 5,941,988 A | 8/1999 | Bhagwat et al. | |
| 5,978,849 A | 11/1999 | Khanna | |
| 6,006,268 A * | 12/1999 | Coile et al. | 709/227 |
| 6,850,982 B1 * | 2/2005 | Siegel | 709/227 |
| 7,016,973 B1 * | 3/2006 | Sibal et al. | 709/238 |
| 7,039,717 B2 | 5/2006 | Johnson | |
| 7,076,555 B1 * | 7/2006 | Orman et al. | 709/227 |
| 7,248,589 B2 | 7/2007 | Banerjee et al. | |
| 2003/0167403 A1 * | 9/2003 | Mccurley et al. | 713/201 |
| 2005/0125532 A1 * | 6/2005 | Kimchi | 709/225 |
| 2005/0149529 A1 | 7/2005 | Gutmans | |
| 2007/0110046 A1 | 5/2007 | Farrell et al. | |
| 2008/0162929 A1 * | 7/2008 | Ishikawa et al. | 713/160 |

FOREIGN PATENT DOCUMENTS

WO    WO2006131600 A1    12/2006

OTHER PUBLICATIONS

Orgiyan et al., "Tapping TCP streams", 2001, IEEE, pp. 278-289.
"Juniper Networks WAN Acceleration Platforms", 1998-2007, Juniper Networks, pp. 1-2.
"Juniper Data Center and Wan Application Acceleration Platforms",1998-2007, Juniper Networks , pp. 1-4.

* cited by examiner

*Primary Examiner*—Dmitry H Levitan (57) ABSTRACT

Aspects of the subject matter described herein relate to locally terminating an established connection. In aspects, a connection between two nodes is established. A network device lies on the path over which packets associated with the connection travel to get to either of the two nodes. After the connection is established, the network device attempts to create a safe point at which the connection can be terminated at the network device. To do so, the network device begins buffering packets and looking for information that indicates that all outstanding packets between the two nodes have been received either by one of the two nodes or have been buffered by the network device. After a safe point is reached, the network device may terminate the connection locally in a way that is transparent to the two nodes.

18 Claims, 7 Drawing Sheets

LOCALLY TERMINATING AN ESTABLISHED CONNECTION

BACKGROUND

On networks, there are network devices that provide connectivity to other devices and networks. Some of these network devices include, for example, firewalls, network address translation (NAT) devices, Web caches, traffic shapers, wide area network (WAN) accelerators, and the like. Some network devices terminate a Transmission Control Protocol (TCP) stream locally and then create separate connections to devices outside of the local network to fulfill requests associated with the stream.

For example, a Web cache may receive a request for a Web page and may satisfy the request immediately if the page is cached on the Web cache. Otherwise, the Web cache may connect to a server having the desired content, retrieve the content, and then satisfy the request. From the requestor's point of view, however, the Web cache is the only device with which the requester needs to interact to obtain the Web page.

In all currently-known implementations, network devices that terminate streams, terminate the streams from the beginning of the communication. This means that the network device sees the stream from the time the stream is initiated to successfully terminate the stream. In these implementations, once a stream is started, there is no way to insert a different device in the established stream.

SUMMARY

Briefly, aspects of the subject matter described herein relate to locally terminating an established connection. In aspects, a connection between two nodes is established. A network device lies on the path over which packets associated with the connection travel to get to either of the two nodes. After the connection is established, the network device attempts to create a safe point at which the connection can be terminated at the network device. To do so, the network device begins buffering packets and looking for information that indicates that all outstanding packets between the two nodes have been received either by one of the two nodes or have been buffered by the network device. After a safe point is reached, the network device may terminate the connection locally.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
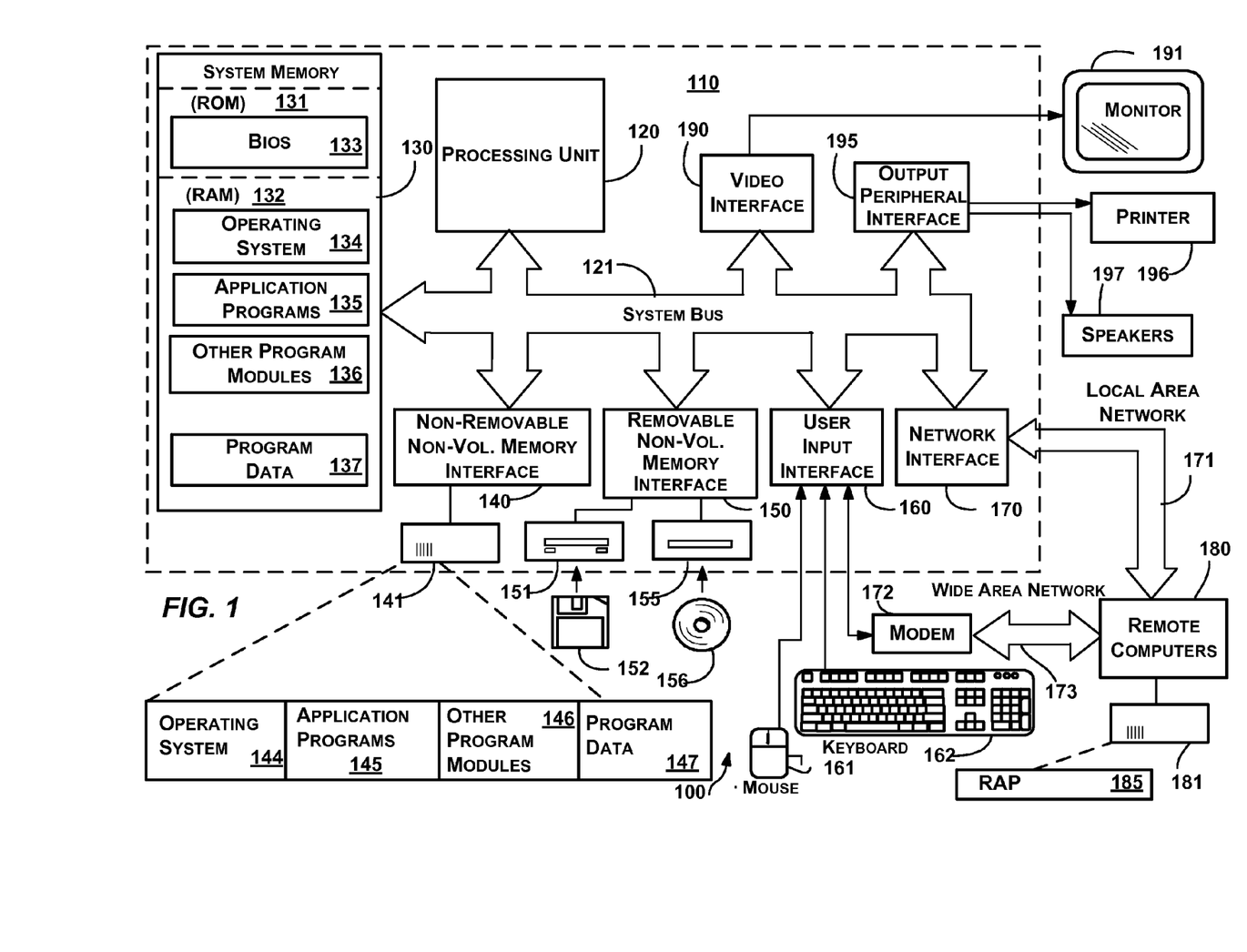
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, one exemplary system for implementing aspects of the subject matter described herein includes a general-purpose computing device in the form of a computer 110. Some other exemplary components, apparatuses, and systems for implementing aspects of the subject matter described herein are described in conjunction with FIGS. 2-5. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Streams

As mentioned previously, network devices currently terminate TCP streams by being involved in the stream from the initiation of the stream. This does not allow insertion of another device into the stream. One approach is to wait for all streams to end before inserting a device. While this may work if all the streams are relatively short in duration, this may not be satisfactory for streams that are longer in duration.

Note that the term "stream" as used herein comprises an established network connection between two devices. The two devices do not need to be physically connected to each other. Furthermore, in between the two devices, there may be one or more devices that handle data that travels in the stream. A stream does not need to constantly be transmitting data and may go through periods of time in which no data is transmitted but in which the stream still exists.

Figure 2:
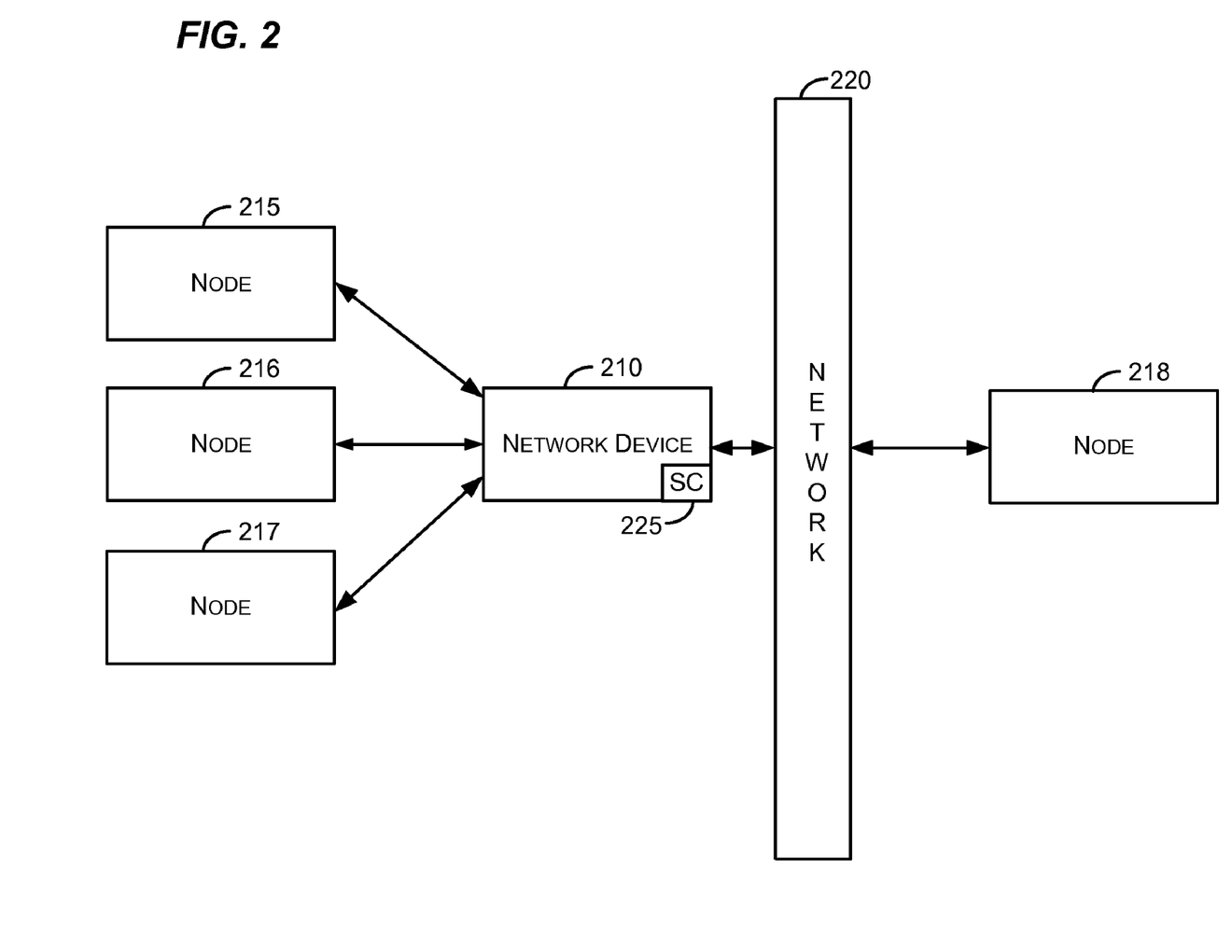
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a network device 210, nodes 215-218, and a network 220 and may include other entities (not shown). The various entities may communicate with each other via various networks including intra- and inter-office networks and the network 220. In an embodiment, the network 220 may comprise the Internet. In an embodiment, the network 220 may comprise one or more private networks, virtual private networks, or the like. The network device 210 may include or have access to stream components 225 that are described in more detail in conjunction with FIG. 6.

Each of the nodes 215-218 may be implemented on or as one or more computers (e.g., the computer 110 as described in conjunction with FIG. 1). The nodes 215-217 may comprise workstations at a company that communicate with the node 218 via the network device 210. The node 218 may be located at any location accessible through the network 220. In today's world, this location may be at a data center, at a company website, on a user's desktop computer, or in some other place to name a few locations. The node may even be located on a network that is local to the nodes 215-217.

The node 218 comprises any device that is capable of communicating with one or more of the nodes 215-217. The node 218 may perform the role of a server, a peer, and/or a client and may switch from one role to another.

The network 220 (or at least the links from the entities to the network 220) may be a relatively slow and bandwidth limited network, although aspects of the subject matter described herein may also be applied to high speed and high bandwidth networks. Indeed, there is no intention to limit aspects of the subject matter described herein to just low bandwidth or high latency networks. Furthermore, it will be recognized by those skilled in the art that aspects of the subject matter may be employed between any two entities connected by any type of network.

The network device 210 may comprise a firewall, router, bridge, computer (e.g., such as the computer 110 of FIG. 1), or the like. The network device 210 may receive packets to and from the nodes 215-217. In operation, the network device 210 may forward packets using layer 2 (L2), layer 3 (L3), or some other mechanism. In addition to forwarding packets, the network device 210 may locally terminate TCP connections by, in part, altering destination IP addresses/ports of packets going to a remote location (e.g., node 218) and correspondingly altering source addresses/ports of reply packets to make them look like they arrived from the remote location.

Although the environment described above includes a network device and nodes in various configurations, it will be recognized that more, fewer, and/or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
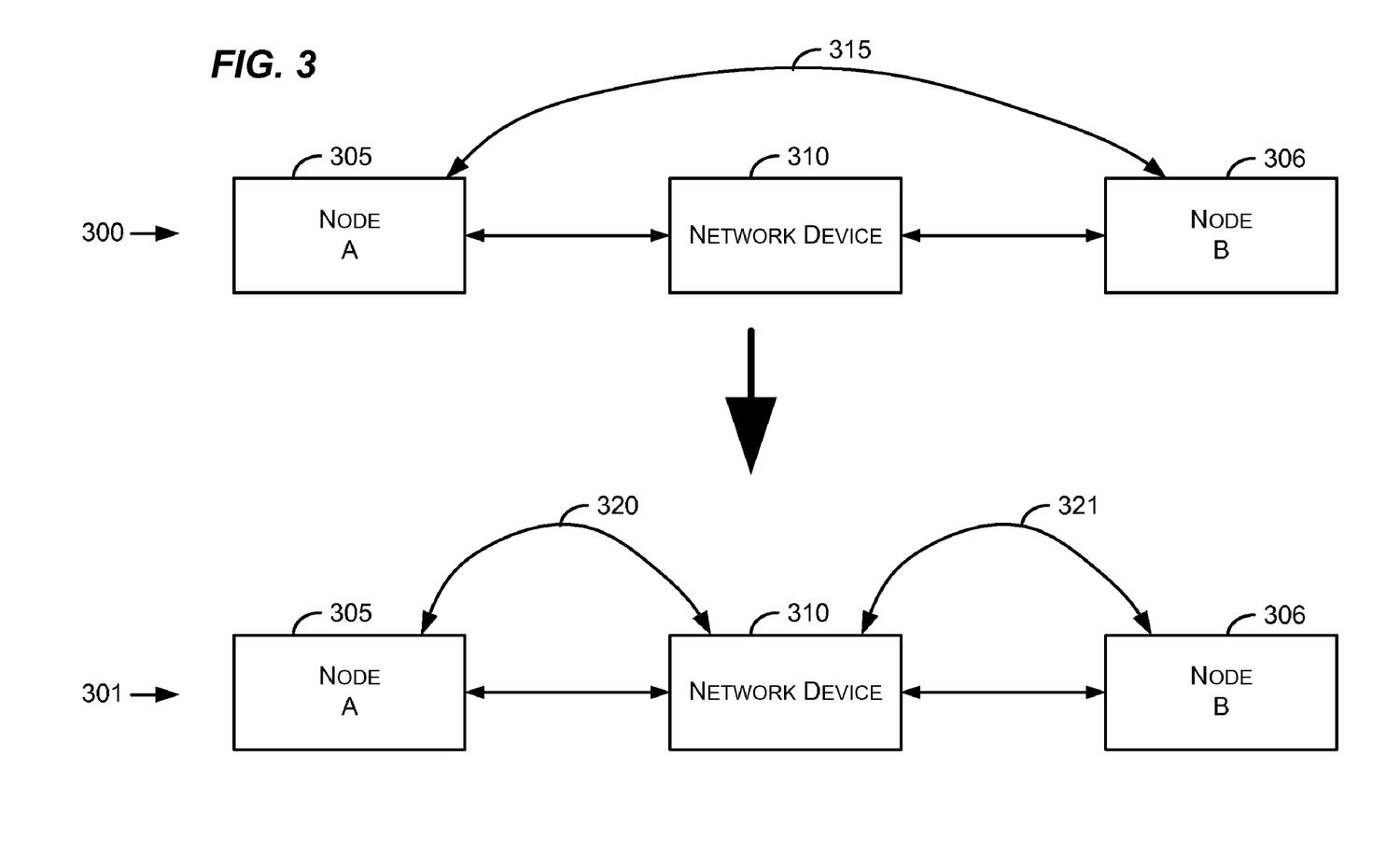
FIG. 3 is a block diagram illustrating an established connection being split via a network device in accordance with aspects of the subject matter described herein.

FIG. 3 is a block diagram illustrating an established connection being split via a network device in accordance with aspects of the subject matter described herein. At time 300, the nodes 305 and 306 have an established connection 315 over which they are communicating. This connection is facilitated by the network device 310 which forwards packets between the nodes 305 and 306.

At time 301, the connection 315 has been split into two connections, namely connections 320 and 321. Each of the new connections is now terminated at the network device 310 instead of simply being forwarded via L2 or L3 mechanisms. To split the connection 315 into the new connections 320 and 321, the network device 310 may perform a set of actions including:

1. Creating a safe point at which the connection 315 may be split without losing data;
2. Splitting the connection 315 into the new connections 320 and 321; and
3. Forwarding data that was buffered while creating the safe point.

A safe point is a state in which there are no outstanding packets sent from node 305 to node 306 that are in transit from the network device 310 to the node 306 and no packets that are sent from the node 306 to node 305 that are in transit from the network device 310 to the node 305. In other words, data sent in either direction has either been received by node 305 or 306 or has been received by the network device 310.

In TCP connections, each packet includes a sequence number and an acknowledgment number. The first sequence number of a TCP connection may be arbitrarily selected. As data is sent, the sequence number is incremented by the amount of data sent. For example, if a TCP connection has sent 10 packets that each include 50 bytes of data, and another packet is sent over the TCP connection, this $11^{th}$ packet would have a sequence number of x+500, where x is the initial sequence number.

The acknowledgment number indicates what bytes have been received by the receiving node and what byte the receiving node expects to receive next. In the example above, if the receiving node had received the first 8 packets, it would respond with an acknowledgment of x+401. This indicates that the receiving node has successfully received the first 400 bytes of the communication and that it is waiting for the $401^{st}$ byte.

A network device facilitating a TCP connection, may buffer packets and use the sequence and acknowledgment numbers to create a safe point. For example, referring to FIG. 3, the network device 310 (sometimes called "P" for short) may listen for packets between the node 305 (sometimes called "A" for short) and the node 306 (sometimes called "B" for short). When the first packet from A is received that has a non-empty payload, P may record the packet sequence number and acknowledgment number and forward the packet to B. Hereinafter, the first packet that has a non-empty payload is sometimes referred to as the "first packet." After the first packet is received from A, all other packets between A and B may be buffered by P. In buffering the packets between A and B, P may record the maximal acknowledgment numbers of the buffered packets. When an acknowledgment number from B indicates that the B has received all data that was sent before P started buffering packets, this means that there are no packets going from A to B that are between P and B. Similarly, when an acknowledgment number from A indicates that A has received all data from B that was sent before P started buffering packets, this means that there are no packets from B to A that are between P and A. This condition is then a safe point to split the connection between A and B.

Error or other conditions may occur while P waits for a safe point. In one embodiment, if the network device receives an indication of an error or other abnormal condition, the network device forwards all of its buffered packets for the connection toward their respective destinations and may wait for a period of time before again trying to determine a safe point. For example, a FIN or RST packet may be received from either A or B. These types of packets are associated with the closing of the connection. In this case, P may forward all the packets it has been buffering before forwarding the FIN or RST packet.

Another example of an error or other condition is receiving a packet with an unexpected sequence number. This may indicate that retransmission is occurring, that some packets got lost in delivery, that some packets were delivered out of order, or some other error or condition. In this case, P may forward all the packets it has been buffering and reinitiate the process of finding a safe point after a timeout period.

Based on the teachings herein, those skilled in the art may recognize other errors or conditions that may occur when trying to find a safe point. In most or all cases, the network device may respond to these errors or conditions by forwarding all buffered packets and reinitiating the process of finding a safe point after a timeout period if appropriate. It may not be appropriate to reinitiate the process of finding a safe point if a connection is being terminated by either node, for example.

In other embodiments, when an error is received, the network device 210 may apply a more sophisticated recovery procedure. For example, if out-of-order packets are received, the network device may reorder the packets to attempt recovery without forwarding the buffered packets. In general, a suitable recovery procedure is one that does not break the TCP connection while attempting to arrive at a safe point. It is not intended to limit recovery procedures to those described above. Indeed, in light of the teachings herein, those skilled in the art will recognize many suitable recovery procedures that may be used without departing from the spirit or scope of aspects of the subject matter described herein.

As an optimization, in one embodiment, leading edge empty packets may be passed through the network device without buffering them. A leading edge empty packet occurs after the network device is attempting to find a safe point when the first packet that is received by the network device from either of the nodes is empty. An empty packet does not include a payload of data, but may include an acknowledgment of what packets a node has received. For example, node 306 may send an empty packet to the node 305 indicating that the node 306 has received 400 bytes of data via a connection between node 305 and 306. In a TCP connection, for example, this may be indicated by sending ACK(Y), where Y=x+401, where x is the initial sequence number sent by node 305.

After a safe point is found, new sockets may be created to split each stream into two streams, each of which are terminated at the network device. In creating a socket, the initial sequence number of the socket may be changed to make it match the appropriate stream. In addition to changing the initial sequence number, the source IP address and port number may also be changed to match the source IP address and port number of the peer node A or B, depending on the direction. With these changes, the checksum may also be recomputed when sending packets via a new socket.

After P creates the socket, P may connect the socket with A using the same port which A used on the original AB connection. To do this, a driver on P may intercept the SYN (synchronize) packet before it is sent to A and respond with a SYN/ACK packet simulating a response from A. The current sequence number from A may be used as the sequence number sent to A. The driver on P may then drop the SYN packet so that it does not get sent to A and confuse A. After the socket on P responds with an ACK reply, the driver on P may simply drop the ACK. At this point the socket on P has established a connection with the socket on A. A similar procedure may be used to establish a session with a socket on B.

To transmit the buffered packets via the new connections, first the TCP payloads may be extracted. In this step, all unnecessary network headers may be thrown away. Some exemplary network headers that may be thrown away include the IP, TCP, and Ethernet headers. After the headers are thrown away, the TCP payloads may be concatenated together and sent to the established sockets on P.

In sending the packets via the newly established sockets, ongoing translation occurs. For each packet, the source IP address and port number are changed to match the source nodes IP address and port number, the sequence number is adjusted, and the checksum is recomputed as described previously. With these modifications, it appears to nodes that they have a connection that terminates with each other.

Figure 4:
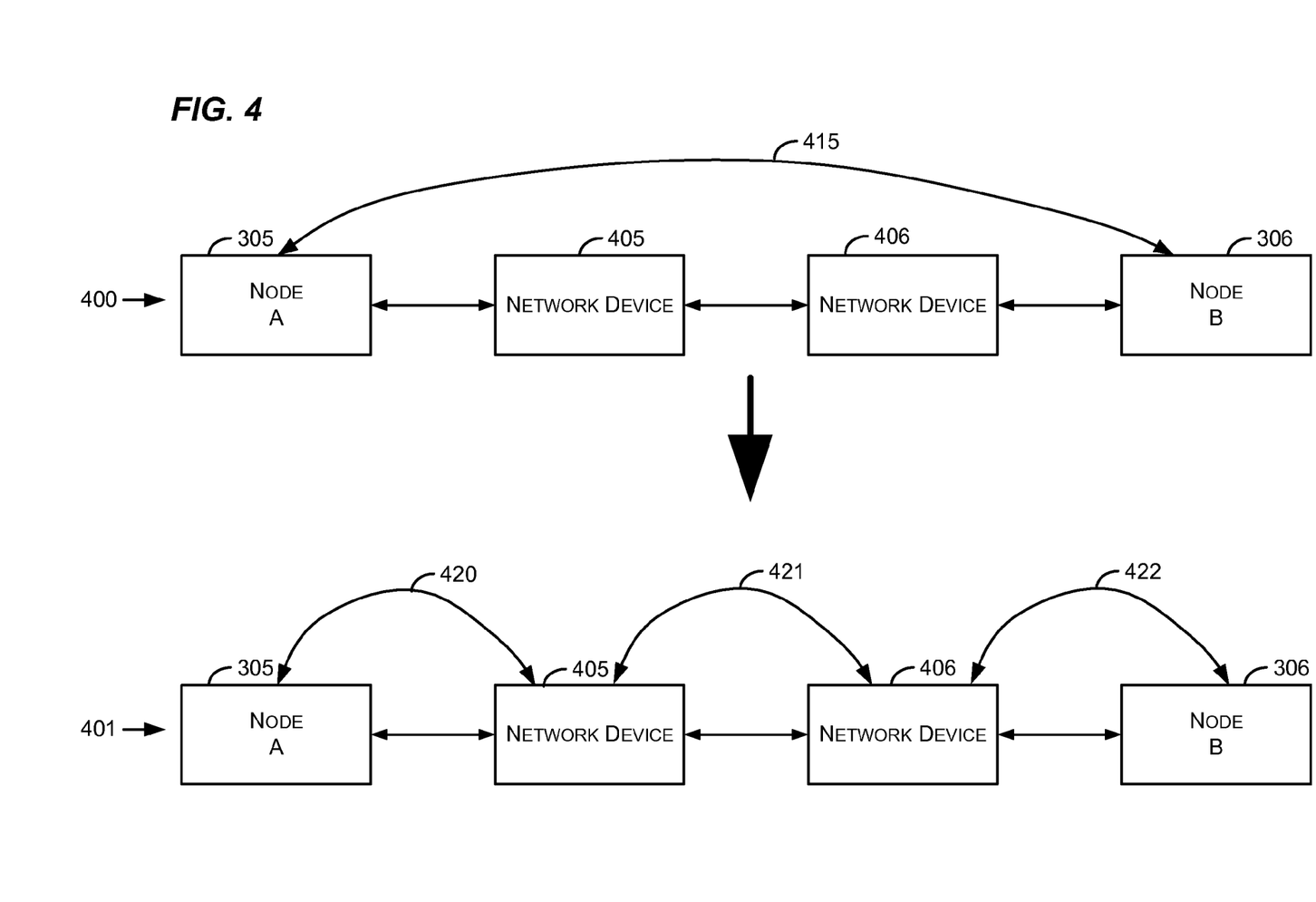
FIG. 4 is a block diagram illustrating an established connection being split where there are two network devices in accordance with aspects of the subject matter described herein.

FIG. 4 is a block diagram illustrating an established connection being split where there are two network devices in accordance with aspects of the subject matter described herein. In one embodiment, the network link between the network devices 405 and 406 may be a relatively slow link such as an Internet link or other low bandwidth and/or high latency link. By using Web acceleration methods, the data rate between the network devices 405 and 406 may be increased. In other embodiments, aspects of the subject matter also apply to relatively high bandwidth and/or low latency links between the network devices 405 and 406.

At time 400, the node 305 (sometimes referred to as "A") has a connection with the node 306 (sometimes referred to as "B") and packets pass through the network devices 405-406 to go from A to B or vice versa.

At time 401, the connection 415 has been split into connections, 420, 421, and 422. To accomplish this, one of the network devices may create a safe point while the other network device may continue to forward traffic as usual. For explanatory purposes, assume that the network device 405 is creating the safe point. Then the network device 405 follows the actions described above in conjunction with FIG. 3. In particular, the network device 405 receives a first packet from A, records the sequence and acknowledgment numbers therein, and forwards the packet to B. Afterwards, the network device 405 buffers additional packets between A and B until it finds a safe point.

In addition, the network devices 405 and 406 establish a connection 421 with each other. To do this, they may first discover each other through a discovery protocol. They may also negotiate a compression algorithm for sending data to each other.

After the safe point is created and the network devices 405 and 406 have established the connection 421, the network device 405 establishes a connection 420 with A using a new socket while the network device 406 establishes a connection 422 with B using a new socket. The network devices 406 create these sockets as indicated previously such that to A and B, it appears that they are still connected to each other.

After these connections are established, the network device 405 forwards buffered packets for A to A and sends the other packets to the network device 406 over the connection 421. The network device 406 sends packets to B over the connection 422. Subsequent packets flow over the connections 420 and 422 with translations of IP addresses, port numbers, and sequence and acknowledgment numbers as appropriate.

For the connection 421 between the network device 405 and 406, no translations of IP addresses, port numbers, and sequence and acknowledgment numbers are needed. Instead, each of the network devices may use a normal connection to send the data. The receiving network device may then perform translations and compute new checksums as appropriate when communicating with the destination node.

When aspects of the subject matter described herein are applied to TCP connections, TCP options may also be considered. Supported TCP options are advertised in SYN and SYN/ACK packets. The intersection of advertised options is the set of options used during the data transmission. To support TCP options, a network device may store used options from a connection establishment. These stored options may then be retrieved later when it is desired to terminate the connection at the network device.

To support the TCP window scale option, if the scale factors advertised by the nodes 305 and 306 are different, the window size parameter is fixed in every packet from the network device 405 to the node 305.

If the window scale factor advertised by the network device 406 and the node 306 are different, the Relative Origin and Block Size fields of the SACK (selective acknowledgment) is fixed in every packet from the node 305 to the network device 405.

If the TCP echo option is advertised during the connection establishment, the network devices 405 and 406 do not need to fix each packet to adjust for this option.

If either the TCP maximum segment size option or the explicit congestion notification option is set, no special handling by the network devices 405 and 406 is needed.

Figure 5:
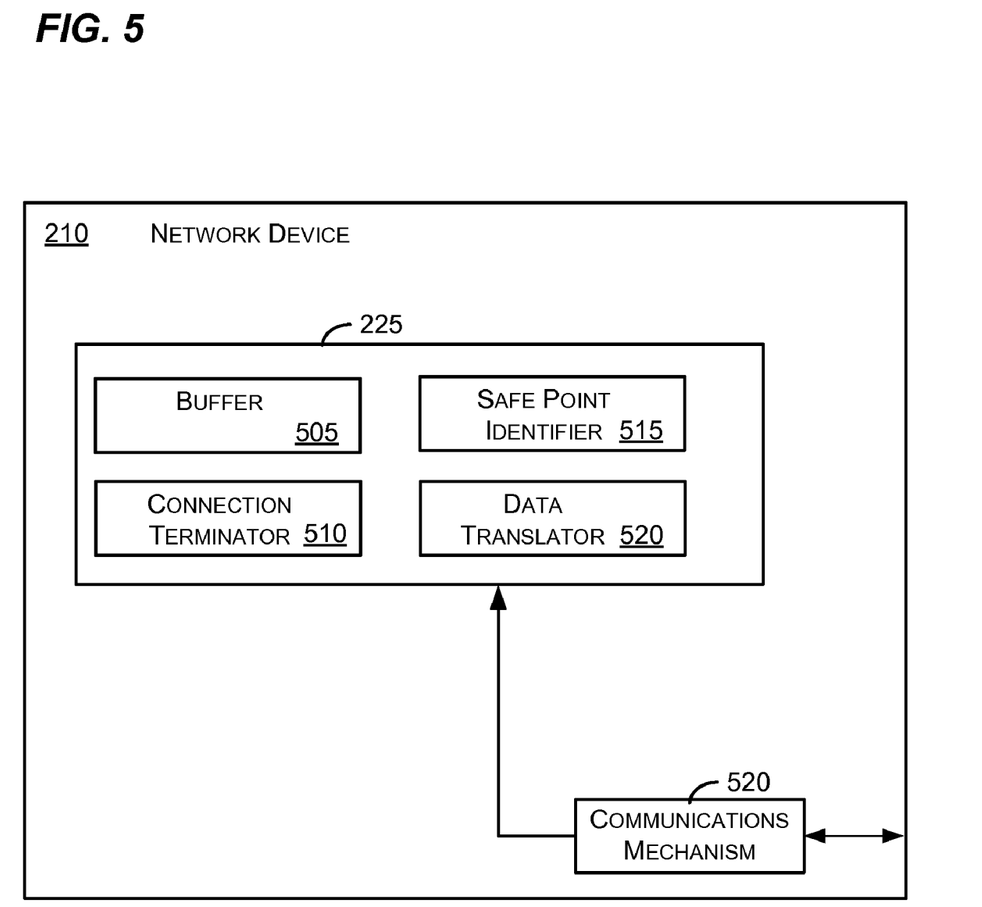
FIG. 5 is a block diagram illustrating various components associated with a network device in accordance with aspects of the subject matter described herein.

FIG. 5 is a block diagram illustrating various components associated with a network device in accordance with aspects of the subject matter described herein. The components illustrated in FIG. 5 are exemplary and are not meant to be all-inclusive of components that may be needed or included. In other embodiments, the components or functions described in conjunction with FIG. 5 may be included in other components or placed in subcomponents without departing from the spirit or scope of aspects of the subject matter described herein.

Turning to FIG. 5, the network device 210 may include stream components 225 and a communications mechanism 520. The stream components 225 may include a buffer 505, a connection terminator 510, a safe point identifier 515, and a data translator 520. Although in one embodiment, the stream components 225 may reside on the network device 210, in other components, one or more of these components may reside on other devices. For example, one or more of these components may be provided as services by one or more other devices. In this configuration, the network device 210 may cause the functions of these components to be performed by interacting with the services on the one or more other devices and providing pertinent information.

The buffer 505 is operable to store data sent via a connection between two nodes. The data may include the entire content of the packets, just the payloads of the packets, other information about the packets, a combination of the above, and so forth.

The connection terminator 510 may operate to terminate a connection at the apparatus. The connection terminator 510 may comprise a device driver that intercepts packets from the TCP stack of the network device 210. When the connection terminator 510 receives a SYN packet from a socket that has been created on the network device 210 to locally terminate a connection, the connection terminator 510 may respond with a SYN/ACK packet. When the connection terminator 510 receives an ACK reply, it may simply drop the ACK reply as described previously.

The safe point identifier 515 is operable to locate safe point at which the connection can be terminated locally. As finding a safe point has been described previously, it will not be described in more detail here.

The data translator 520 is operable to change data in packets sent from the apparatus in accordance with a packet sending protocol. This changing of the data in the headers of the packets is done to "fool" the nodes into believing that the connection is still terminated at the nodes instead of at the stream components 225. Again, the data that is changed has been described previously and will not be described in more detail here.

Figure 6:
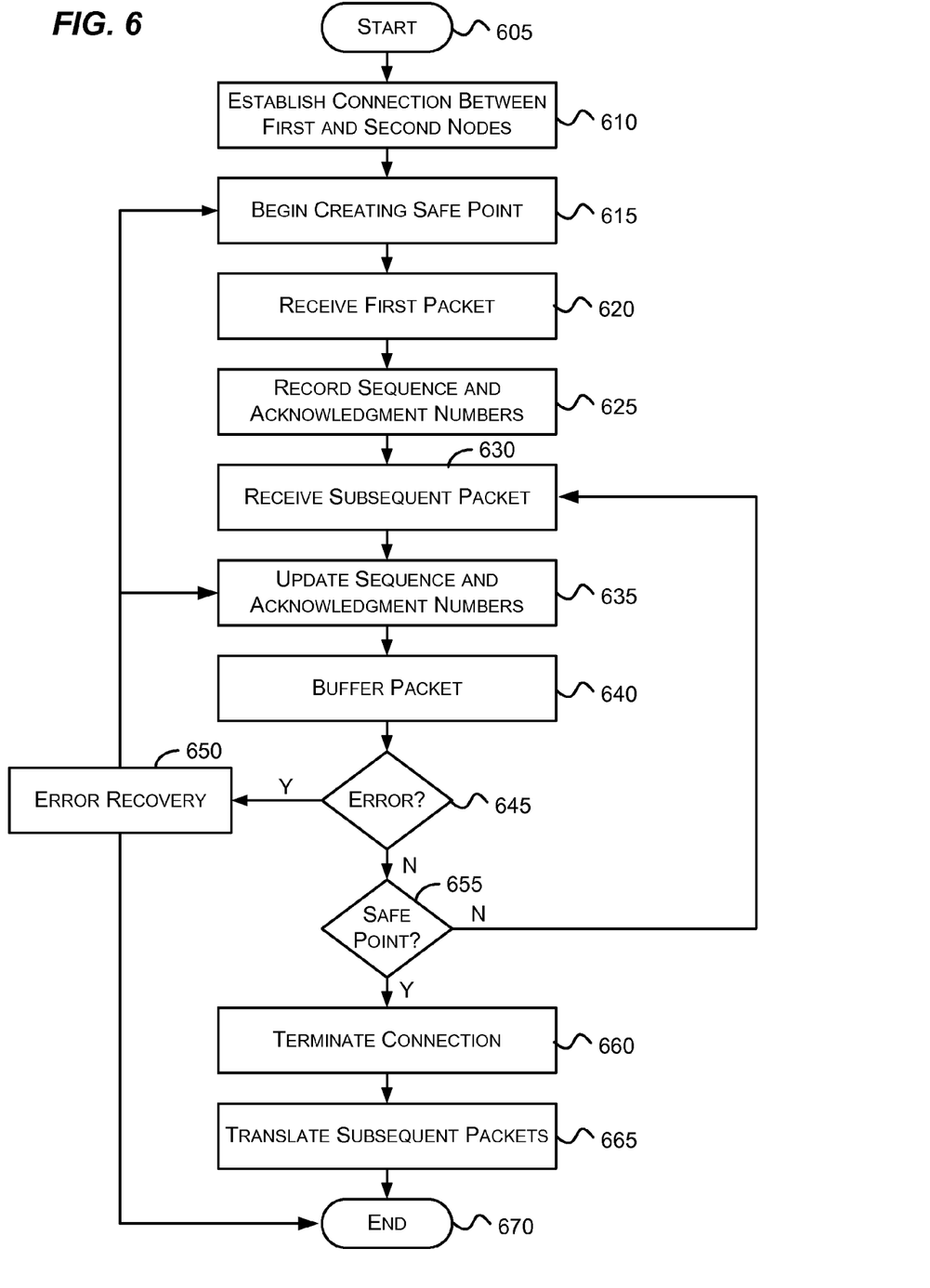
FIGS. 6-7 are flow diagrams that generally represent exemplary actions that may occur in terminating an established connection locally in accordance with aspects of the subject matter described herein.
Figure 7:
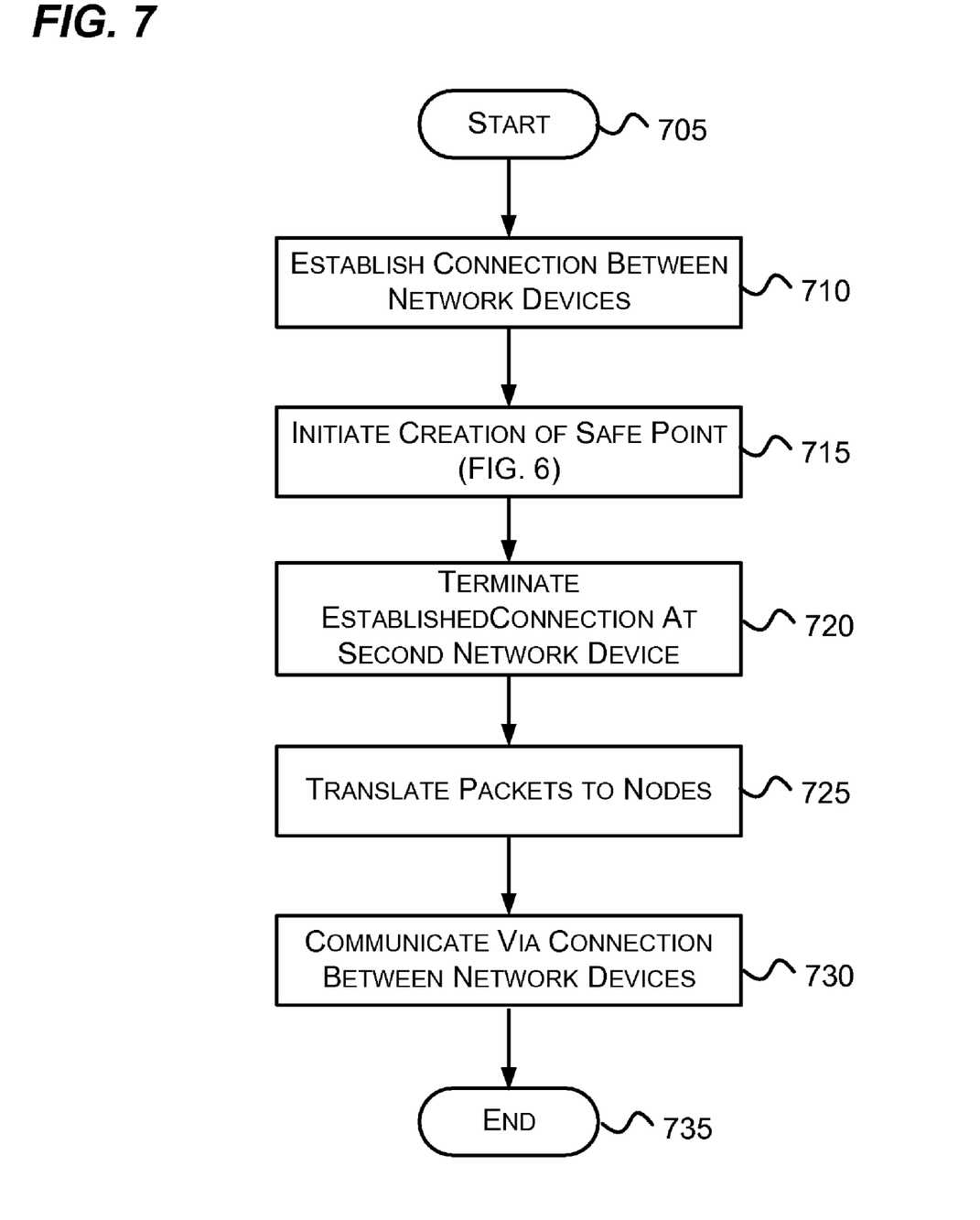

FIGS. 6-7 are flow diagrams that generally represent exemplary actions that may occur in terminating an established connection locally in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a connection between a first node and a second node is established. For example, referring to FIG. 3, the node 305 may establish a connection with the node 306.

At block 615, a network device begins creating a safe point. For example, referring to FIG. 3, the network device 310 begins monitoring and buffering packets sent on the connection 315.

At block 620, a first packet is received at the network device. Note that the term first packet does not mean that the network device receives the connection establishment packets between the nodes, or if it did receive these packets that it stored information about original sequence numbers. Rather, the term "first packet" refers to the network device receiving a packet with a non-empty TCP payload from one of the nodes after the commencement of creating a safe point. For example, referring to FIG. 3, the network device 310 receives a packet from the node 305.

At block 625, the sequence and acknowledgment numbers associated with the packet are recorded. For example, referring to FIG. 3, the network device 310 records (e.g., stores) the sequence and acknowledgment number included in the first packet received from the node 305.

At block 630, a subsequent packet is received. For example, referring to FIG. 3, the network device 310 receives a subsequent packet from the node 306.

At block 635, sequence and acknowledgment numbers are updated as appropriate. For example, if the packet includes an acknowledgment number that is larger than the recorded acknowledgment number, the recorded acknowledgment number is updated to reflect that additional data has been received.

At block 640, the packet is buffered. For example, referring to FIG. 3, the network device 310 buffers the packet received from the node 306. Note that the network device may not buffer the first packet received after commencement of creating a safe point and may not buffer empty leading edge packets as described previously.

At block 645, if an error or other abnormal condition occurs, the actions continue at block 650. For example, referring to FIG. 3, if the network device 310 receives a retransmitted packet, the actions continue at block 650.

At block 650, error recovery is performed. It is possible that the error recovery will allow the network device to continue receiving subsequent packets, that the error recovery will include sending the buffers to the respective nodes and restarting the creation of a safe point, or that the error recovery will include ending the process. For example, referring to FIG. 3, the network device 310 may send buffered packets to their destination nodes, wait for a timeout period to expire, and then resume creating a safe point at block 615.

At block 655, a determination is made as to whether a safe point has been reached. If so, the actions continue at block 660; otherwise, the actions continue at bock 630. For example, referring to FIG. 3, if the network device 310 determines that the nodes 305 and 306 have received all packets sent before buffering commenced, the network device 310 may determine that a safe point has been reached.

At block 660, the connection is terminated at the network device. For example, referring to FIG. 3, the network device 310 terminates the connection 315 from the node 305 at the network device 310. In a single network device configuration, the network device 310 may also terminate the connection 315 from the node 306 at the network device 310.

At block 665, subsequent packets are translated as described previously. For example, referring to FIG. 3, when the network device 310 sends a packet to the node 305, the network device 310 may translate source addresses and re-compute checksums as described previously.

At block 670, the actions end.

FIG. 7 is a block diagram that generally represents actions that may occur when two network devices are used in accordance with aspects of the subject matter described herein. At block 705, the actions begin.

At block 710, a connection is established between two network devices. For example, referring to FIG. 4, the network devices 405 and 406 establish a connection. Note that this connection may be established before or after a first packet is received from either of the nodes 305 and 306.

At block 715, creation of a safe point is initiated on one of the network devices. The actions corresponding to block 715 may include the actions associated with block 610-660 of FIG. 6.

At block 720, the established connection (i.e., the connection between the two nodes) is terminated at the second network device. For example, referring to FIG. 4, the network device 406 terminates the connection 415 at the network device 406 to form the connection 422.

At block 725, packets are translated to the nodes. For example, referring to FIG. 4, the network device 406 translates packets that are sent to the node 306 so that they appear to have originated from the node 305.

At block 730, the network devices communicate via the connection between the network devices. For example, referring to FIG. 4, the network devices 405 and 406 use the connection 421 to communicate data between the nodes 305 and 306. As described previously, the network devices 405 and 406 may perform various processing on the data as desired.

At block 735, the actions end.

As can be seen from the foregoing detailed description, aspects have been described related to locally terminating an established connection. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:

receiving, at a network device, a first packet from a first node, the packet being addressed to a second node, the first and second nodes already having a connection established between them;

buffering, by the network device, one or more subsequent packets sent via the connection;

determining from data included in the packets whether the first node has received all data sent via the connection by the second node before the buffering and whether the second node has received all data sent via the connection by the first node before the buffering;

terminating the connection at the network device;

translating a source address in a second packet sent from the network device to the first node to an address of the second node, such that the second packet appears to have originated at the second node; and translating a source address in a third packet sent from the network device to the second node to an address of the first node, such that the third packet appears to have originated at the first node.

2. The computer storage medium of claim 1, further comprising:

receiving the second packet from the second node, the second packet having an empty payload; and forwarding the second packet to the first node without buffering the second packet.

3. The computer storage medium of claim 1, further comprising:

receiving the second packet from the first node, the second packet having an empty payload, the second packet being received at the network device before the first packet; and forwarding the second packet to the second node without buffering the second packet.

4. The computer storage medium of claim 1, further comprising determining that an error has occurred and subsequently forwarding any buffered packets.

5. The computer storage medium of claim 1, further comprising determining that an error has occurred and subsequently attempting to resolve the error.

6. The computer storage medium of claim 1, wherein having a connection established between the first and second nodes comprises having a transmission control protocol (TCP) connection established between the first and second nodes.

7. A computer storage medium having computer-executable instructions, which when executed perform actions, comprising:

receiving, at a network device, a first packet from a first node, the packet being addressed to a second node, the first and second nodes already having a connection established between them;

buffering, by the network device, one or more subsequent packets sent via the connection;

determining from data included in the packets whether the first node has received all data sent via the connection by the second node before the buffering and whether the second node has received all data sent via the connection by the first node before the buffering;

recording a first number that indicates how much data has been sent from the first node to the second node, the first number being included in the first packet;

recording a second number that indicates how much data has been received from the second node by the first node, the second number being included in the first packet; and forwarding the first packet toward the second node.

8. The computer storage medium of claim 7, further comprising:

receiving a second packet from the second node, the second packet including a third number and a fourth number, the third number indicating how much data has been sent by the second node toward the first node, the fourth number indicating how much data has been received from the first node by the second node; and recording the third and fourth numbers.

9. The computer storage medium of claim 8, further comprising updating the first, second, third, and fourth numbers in accordance with corresponding numbers received in subsequent packets.

10. The computer storage medium of claim 9, wherein determining from data included in the packets whether the first node has received all data sent via the connection by the second node before the buffering and whether the second node has received all data sent via the connection by the first node before the buffering comprises:

comparing the first number with the fourth number to determine whether the second node has received all data sent by the first node via the connection before the buffering; and comparing the second number with the third number to determine whether the first node has received all data sent by the second node via the connection before the buffering.

11. A method implemented at least in part by a computer, the method comprising:

receiving, at a first network device, a first packet from a first node, the packet being addressed to a second node, the first and second nodes already having a first connection established between them;

buffering, by the first network device, data sent via the first connection;

determining from data whether the first node has received all data sent via the first connection by the second node before the buffering and whether the second node has received all data sent via the first connection by the first node before the buffering;

establishing a second connection with a second network device, the second network device in a path used by the first connection;

terminating the first connection at the first network device and sending the buffered data to the second network device using the second connection;

receiving a second packet from the first node at the first network device; and sending the second packet from the first network device to the second node through the second connection and second network device.

12. The method of claim 11, wherein terminating the first connection at the first network device comprises using packet sequence numbers and acknowledgment numbers corresponding to the first connection when sending packets to the first node and inserting a source address associated with the second node when sending the packets.

13. The method of claim 12, wherein terminating the first connection at the first network device further comprises removing source address information from packets received from the first node that indicate that the packets came from the first node.

14. The method of claim 11, further comprising negotiation a compression algorithm to use on the second connection and wherein sending the buffered data to the second network device using the second connection comprises compressing the buffered data according to the compression algorithm.

15. The method of claim 11, further comprising terminating the first connection at the second network device, the terminating the first connection at the second network device comprising creating a socket at the second network device to communicate with the second node and changing an initial sequence number associated with the socket.

16. In a computing environment, an apparatus, comprising:

a buffer operable to store data sent via a connection between a first node and a second node after a first time, the connection being established before the first time;

a safe point identifier operable to locate a second time at which the first node has received all data sent from the second node via the connection prior to the first time and at which the second node has received all data sent from the first node via the connection prior to the first time;

a connection terminator operable to terminate the connection locally; and a data translator operable to change data in packets sent from the apparatus to either of the nodes to conform with a packet sending protocol to indicate that packets sent from the apparatus to either of the nodes are sent from the first or the second of the nodes.

17. The apparatus of claim 16, wherein the connection terminator comprises a device driver attached to a network interface, the device driver intercepting packets from a transmission control protocol (TCP) stack, the connection terminator being further operable to generate connection establishment responses when terminating the connection at the network access device.

18. The apparatus of claim 16, wherein the safe point identifier does not have access to at least one packet received before the first time from the first node or the second node that established the connection.

* * * * *